United States Patent [19]

Sekiya et al.

[11] Patent Number: 5,633,746
[45] Date of Patent: May 27, 1997

[54] MAGNETO-OPTICAL RECORDING MEDIUM

[75] Inventors: Masahiko Sekiya, Hino; Kiyoshi Chiba, Chofu, both of Japan

[73] Assignee: Teijin Limited, Osaka, Japan

[21] Appl. No.: 445,654

[22] Filed: May 22, 1995

Related U.S. Application Data

[62] Division of Ser. No. 80,391, Jun. 21, 1993, Pat. No. 5,492,773.

[30] Foreign Application Priority Data

Sep. 13, 1988 [JP] Japan .................................. 63-227548
Oct. 4, 1988 [JP] Japan .................................. 63-248990

[51] Int. Cl.$^6$ .................................. G11B 5/66; G11B 5/74; G11B 11/00; B32B 5/16
[52] U.S. Cl. .................................. 359/280; 428/694 DE; 428/694 ML; 428/649 MT; 428/694 RL; 428/900; 428/338; 428/328; 428/336; 428/323; 360/131; 369/288; 369/13
[58] Field of Search .................................. 428/694 DE, 649 ML, 428/694 MT, 694 RL, 900, 338, 328, 336, 323; 369/288; 364/13; 360/131

[56] References Cited

U.S. PATENT DOCUMENTS 5,492,773 2/1996 Sekiya et al. .................... 428/694 ML

FOREIGN PATENT DOCUMENTS 61-115258 6/1986 Japan .
63-113835 5/1988 Japan .

*Primary Examiner*—Mark Hellner
*Attorney, Agent, or Firm*—Burgess, Ryan and Wayne

[57] ABSTRACT

A magneto-optical recording medium having an improved durability or reliability is obtained by providing a protecting layer of an alloy of titanium with one or more of chromium, rhenium and tantalum. This titanium alloy protecting layer has an improved resistance to oxygen, water, chlorine, and acids, etc. and provides an improved resistance to the environment and attacks from the synthetic resin substrate or other layers constituting the medium, such as a dielectric layer and a reflecting layer.

18 Claims, 4 Drawing Sheets

MAGNETO-OPTICAL RECORDING MEDIUM

This is a division of application Ser. No. 08/080,391, filed Jun. 21, 1993 now U.S. Pat. No. 5,492,773.

BACKGROUND OF THE INVENTION

1. Field of the Invention

The present invention relates to a magneto-optical recording medium capable of recording, reproducing, and erasing etc. information by a laser beam, and the like. Particularly, the present invention relates to a highly reliable magneto-optical recording medium, comprising a metal recording layer having an easy axis of magnetization perpendicular to the layer surface thereof, in which recording and reproducing of information is obtained by the magneto-optical effect.

2. Description of the Related Art

Optical recording media have been widely investigated and developed since they are capable of high density and large capacity recording of information. Particularly, magneto-optical recording media can be utilized in various fields and therefore, various materials and systems therefor have been proposed and will be practically utilized.

As such materials proposed for the magneto-optical recording media are FeTb (Japanese Unexamined Patent Publication No. 52-31703), FeTbGd (Japanese Unexamined Patent Publication No. 56-126907), FeTbCo and FeCoDy (Japanese Unexamined Patent Publication No. 58-73746), FeNd (Japanese Unexamined Patent Publication No. 61-165846), etc. Nevertheless, further improvements of the recording and reproducing characteristics and durability, including a resistance to oxidation of the recording materials, are necessary before the erasable magneto-optical recording media becomes practically utilizable, since the materials for the magneto-optical recording are very susceptible to a corrosion such as oxidation.

Attempts have been made to realize the above objects by covering both sides of the recording film, and adding various elements to the recording film. Currently, transparent dielectrics of AlN, $Si_3N_4$, ZnS, SiO, $Y_2O_3$, etc., among others, are considered preferable for the protecting layer, but the permeation of oxygen and water from the atmosphere as well as permeation and diffusion of water and chlorine from the transparent plastic resin substrate cannot be completely prevented, and thus the recording film is deteriorated. With regard to the addition of elements, although some effectively prevent corrosion of the recording film, they disadvantageously cause a reduction of the Kerr rotation angle. In this respect, preferably the protecting layer prolongs the life of the recording film without lowering the characteristics thereof. Therefore, the development of a protecting film or films which effectively prevent a permeation and diffusion of oxygen, water and chlorine, etc. is important.

To this end, a metal protecting layer of metal titanium alone or a combination thereof with dielectric layers as mentioned above has been proposed as an effective protecting layer (EP-A-0245833). Nevertheless, upon investigation of this protecting layer by the inventors, it was found that further improvement is necessary because pin holes were formed during high temperature and high humidity environment resistance tests and the recording film was deteriorated by chlorine or an acid remaining in the resin of an organic protecting layer when applied.

SUMMARY OF THE INVENTION

The object of the present invention is to provide a protecting layer which effectively prevents the permeation and diffusion of oxygen, water, and chlorine, etc., thereby allowing to provide a durable magneto-optical recording medium.

The above object is attained by a magneto-optical recording medium comprising: a substrate, a magneto-optical recording layer above the substrate, and a protecting metal layer above the magneto-optical recording layer, the protecting metal layer being made of a titanium alloy comprised of titanium and at least one of rhenium, chromium and tantalum.

The above invention was created in the following manner. During an investigation of various titanium alloy layers for improving a titanium layer, it was found that a layer of an alloy of titanium (Ti) with at least one of metals (M) of rhenium (Re), chromium (Cr) and tantalum (Ta) has an excellent resistance to corrosion by chloric acid, etc. and crevice corrosion. It was also found that a magneto-optical recording medium having the above titanium alloy layer as a protective layer has a remakably improved durability.

DESCRIPTION OF THE PREFERRED EMBODIMENTS

Figure 1:
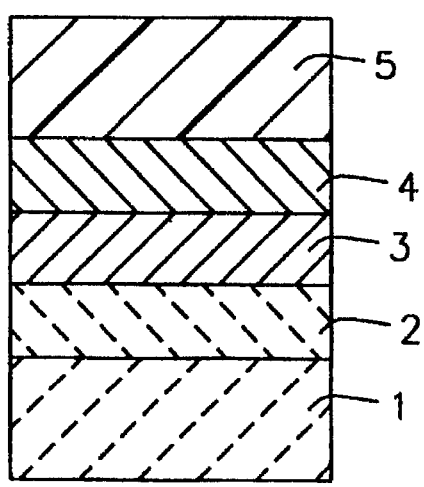
FIGS. 1 to 15 are sectional views showing layer structures of various embodiments of magneto-optical recording media according to the present invention.

First, the titanium alloys used for the protecting layer are described.

To improve the titanium protecting layer, various titanium alloy layers were formed on a glass substrate and evaluated in the manner described below.

In a radio frequency magnetron sputtering device (ANELVA Corporation, SPF-430H), a glass substrate having a width of 26 mm, a length of 76 mm and a thickness of 1 mm was arranged in a vacuum chamber and the chamber was evacuated to $4 \times 10^{-7}$ Torr. During the deposition, the glass substrate was cooled by water. Then pure argon gas was introduced into the chamber and the argon gas flow was adjusted to reach the pressure at 20 mTorr (2.66 Pa). The target was a metal titanium disc having a diameter of 100 mm and a thickness of 5 mm on which a number of chips (5×5×1 mm) of alloy-constituting metals such as metal Cr, metal Ta, and metal Re were appropriately arranged. The discharge power was 250 W, the discharge radio frequency was 13.56 MHz, and the thickness of the alloy layers deposited was about 150 nm. Thus, various samples having a deposited layer of various titanium alloy compositions were obtained.

The thus obtained samples were examined by X-ray diffraction, and the peak intensity and lattice spacing of the [002] plane of the titanium alloy crystals were determined. The device used for the measurement was a high power X-ray diffraction unit, HIGHPOWER UNIT MODEL D-3F, manufactured by Rigaku Industrial Corporation.

Next, the samples were immersed in a 1.2N-aqueous HCl solution for 100 hours, and thereafter, the change of the number of pin holes and the increase of the transmittance of 830 nm light was observed. The transmittance of 830 nm light before the immersion was zero % in all samples. The device used for the measurement of the light transmittance was a 330-type Self-Recording Spectrophotometer, manufactured by Hitachi Ltd.

Also, the samples were immersed in a 10 wt %-aqueous NaCl solution for 200 hours for the crevice corrosion test. In this test, the change of the number of the pin holes was observed.

As seen from the results, shown in Table 1, the resistances to chloric acid and crevice corrosion are remarkably improved in the cases of the alloys of Ti with Re, Cr, Ta or a plurality of these metals, in comparison with the metal Ti alone. Although the results are not shown, alloys of Ti with Zr, V, Mo, W, Mn, Ni, Pd, Pt, Cu, Si, Ge, and Ru were made and evaluated in the same way. Nevertheless, the resistances to the chloric acid and crevice corrosion of these alloys were at most equal to or lower than those of the metal Ti alone.

○: The number of pin holes was increased by not more than 5.

Δ: The number of pin holes was increased by more than 5 to 10.

X: The number of pin holes was increased beyond countability.

TABLE 1

| Sample No. | Composition of layer (atom %) | Peak intensity of [002] plane | Lattice spacing of [002] plane (nm) | Aqueous HCl solution immersion test after 48 h | Aqueous HCl solution immersion test after 100 h | Light transmittance (%) | Crevice corrosion test |
|---|---|---|---|---|---|---|---|
| 1 | $Ti_{100}$ | 6.4 | 0.2344 | Δ | x | 5.0 | x |
| 2 | $Ti_{98}Re_2$ | 6.5 | 0.2321 | ⊚ | o | 0.8 | Δ |
| 3 | $Ti_{90}Re_{10}$ | 6.6 | 0.2282 | ⊚ | o | 0.4 | Δ |
| 4 | $Ti_{85}Re_{15}$ | 9.1 | 0.2266 | ⊚ | ⊚ | 0 | o |
| 5 | $Ti_{70}Re_{30}$ | 19.8 | 0.2250 | ⊚ | ⊚ | 0 | ⊚ |
| 6 | $Ti_{60}Re_{40}$ | 20.0 | 0.2252 | ⊚ | ⊚ | 0 | ⊚ |
| 7 | $Ti_{50}Re_{50}$ | 19.7 | 0.2251 | ⊚ | ⊚ | 0 | ⊚ |
| 8 | $Ti_{40}Re_{60}$ | Amorphous | — | ⊚ | ⊚ | 0 | ⊚ |
| 9 | $Ti_{20}Re_{80}$ | Amorphous | — | ⊚ | ⊚ | 0 | ⊚ |
| 10 | $Ti_{98}Cr_2$ | 6.8 | 0.2335 | ⊚ | o | 0.2 | Δ |
| 11 | $Ti_{90}Cr_{10}$ | 7.9 | 0.2320 | ⊚ | ⊚ | 0.1 | o |
| 12 | $Ti_{85}Cr_{15}$ | 11.0 | 0.2298 | ⊚ | ⊚ | 0 | ⊚ |
| 13 | $Ti_{70}Cr_{30}$ | 15.0 | 0.2257 | ⊚ | ⊚ | 0 | ⊚ |
| 14 | $Ti_{60}Cr_{40}$ | 14.6 | 0.2255 | ⊚ | ⊚ | 0 | ⊚ |
| 15 | $Ti_{50}Cr_{50}$ | 15.3 | 0.2253 | ⊚ | ⊚ | 0 | ⊚ |
| 16 | $Ti_{40}Cr_{60}$ | Amorphous | — | ⊚ | ⊚ | 0 | ⊚ |
| 17 | $Ti_{20}Cr_{80}$ | Amorphous | — | ⊚ | ⊚ | 0 | ⊚ |
| 18 | $Ti_{98}Ta_2$ | 10.8 | 0.2338 | ⊚ | o | 0.5 | Δ |
| 19 | $Ti_{90}Ta_{10}$ | 17.1 | 0.2290 | ⊚ | o | 0.2 | o |
| 20 | $Ti_{85}Ta_{15}$ | 20.1 | 0.2257 | ⊚ | ⊚ | 0 | ⊚ |
| 21 | $Ti_{70}Ta_{30}$ | 44.6 | 0.2233 | ⊚ | ⊚ | 0 | ⊚ |
| 22 | $Ti_{60}Ta_{40}$ | 49.2 | 0.2235 | ⊚ | ⊚ | 0 | ⊚ |
| 23 | $Ti_{50}Ta_{50}$ | 47.1 | 0.2231 | ⊚ | ⊚ | 0 | ⊚ |
| 24 | $Ti_{70}Cr_{15}Re_{15}$ | 15.8 | 0.2270 | ⊚ | ⊚ | 0 | ⊚ |
| 25 | $Ti_{70}Cr_{15}Ta_{15}$ | 20.3 | 0.2259 | ⊚ | ⊚ | 0 | ⊚ |
| 26 | $Ti_{70}Ta_{15}Re_{15}$ | 21.0 | 0.2266 | ⊚ | ⊚ | 0 | ⊚ |
| 27 | $Ti_{70}Cr_{10}Ta_{10}Re_{10}$ | 20.6 | 0.2250 | ⊚ | ⊚ | 0 | ⊚ |
| 28 | $Ti_{80}Mo_{20}$ | 3.0 | 0.2321 | Δ | x | 14.0 | x |

Only the results of an alloy of Ti with Mo are shown as Sample No. 28 in Table 1, as an example of the above alloys.

In Table 1, the mark "——" in the items of the peak intensity and lattice spacing of the [002] plane means that no peak was observed for the [002] plane. Note that the values of the peak intensities are relative.

In the 1.2N-HCl solution immersion test, the respective symbols denote the results based on the following standards by naked eye observation.

⊚: The layer was not deteriorated and the number of the pin holes was not increased.

○: The layer was not deteriorated but the number of the pin holes was slightly increased.

Δ: The layer was deteriorated and the number of the pin holes was increased.

X: The layer was deteriorated and disappeared, and therefore obviously could not be evaluated.

The light transmittance in % was measured after the immersion for 100 hours.

In the crevice corrosion test, the respective symbols denote the results of the increase of the pin holes after the immersion based on the following standards, by naked eye observation.

⊚: The number of pin holes was not increased.

As shown in Table 1, it was found that, by making an alloy of Ti with at least one metal element M of Cr, Ta and Re, the lattice spacing of the [002] plane was shortened from that of the metal Ti alone, or even disappeared due to the formation of an amorphous alloy. This means that, by containing metal Cr, metal Ta and/or metal Re in the metal Ti, the metal Ti crystal is compressed and the density of the metal Ti is increased, or the metal Ti becomes a uniform structure with no grain boundary, which are considered to be the direct causes of the increase in the resistance to acid and the prevention of the pin holes or cracks.

The dependency of the crystalline state of a TiCr alloy on the argon gas pressure during the sputtering was found as below.

In a radio frequency magnetron sputtering device (ANELVA Corporation, SPF-430H Type), a glass substrate having a width of 26 mm, a length of 76 mm and a thickness of 1 mm was fixed in a vacuum chamber and the chamber was evacuated to $4 \times 10^{-7}$ Torr ($5.32 \times 10^{-5}$ Pa). The glass substrate was cooled during the deposition.

Then, a pure argon gas (5N) flow was introduced into the chamber and the pressure was adjusted to 5 mTorr (0.67 Pa) or 20 mTorr (2.66 Pa). The target used was a titanium disc having a diameter of 100 mm and a thickness of 5 mm on which an adequate number of Cr chips (5×5×1 mm) were arranged such that the composition of the deposited layer was $Ti_{80}Cr_{20}$. The discharge power was 250 W and the discharge radio frequency was 13.56 MHz. The thickness of the deposited layer was about 150 nm.

The obtained layer was examined by X-ray diffraction to check the state of the crystal. The measuring unit used was a high power X-ray diffraction unit, HIGHPOWER UNIT MODEL D-3F, manufactured by Rigaku Industrial Corporation.

As a result, it was found that the layer deposited at an Ar gas pressure of 5 mTorr (0.67 Pa) was amorphous, and the layer deposited at an Ar gas pressure of 20 mTorr (2.66 Pa) had a peak of the [002] plane of the titanium crystal, which indicated that the latter layer was in the crystalline state.

The above results indicate that the crystalline state of a TiCr alloy is varied by the argon gas pressure during the sputtering, even if the composition of the alloy was the same.

The humidity permeability coefficient was measured on the titanium alloy and titanium layers. In the same radio frequency magnetron sputtering device as before, a film substrate of polycarbonate having a diameter of 70 mm and a thickness of 30 μm was arranged and the pressure of pure argon gas (5 nine degree) was adjusted to 5 mTorr (0.67 Pa). Thus, samples having a predetermined composition were obtained.

Then, a humidity permeability measuring cup for the test under JIS Z 1503 was charged with dry calcium chloride and the above sample was fixed thereto. This cup was allowed to stand in an atmosphere of 40° C. and 90% RH for 48 hours, and from the weight change of the calcium chloride, the humidity permeability coefficient was calculated.

The results are shown in Table 2. As seen in Table 2, the humidity permeability coefficient was more improved in the titanium alloy layer than in the titanium alone layer. Particularly, the humidity permeability coefficient of the TiRe alloy layer was improved compared to that of the titanium alone later by one order of magnitude.

TABLE 2

| Composition (atom %) | Humidity permeability coefficient (g mm/m²day) |
| --- | --- |
| $Ti_{90}Re_{10}$ | $8.0 \times 10^{-7}$ |
| $Ti_{80}Re_{20}$ | $4.0 \times 10^{-7}$ |
| $Ti_{50}Re_{50}$ | $4.0 \times 10^{-7}$ |
| $Ti_{90}Cr_{10}$ | $19.0 \times 10^{-7}$ |
| $Ti_{80}Cr_{20}$ | $14.0 \times 10^{-7}$ |
| $Ti_{50}Cr_{50}$ | $13.0 \times 10^{-7}$ |
| $Ti_{90}Ta_{10}$ | $40.0 \times 10^{-7}$ |
| $Ti_{80}Ta_{20}$ | $37.0 \times 10^{-7}$ |
| $Ti_{50}Ta_{50}$ | $35.0 \times 10^{-7}$ |
| $Ti_{100}$ | $62.0 \times 10^{-7}$ |

In accordance with the present invention, the content x (atom %) of the metal M in the alloy $Ti_{100-x}M_x$ where M is at least one metal of Cr, Ta and Re is generally 2 to 80 atom %. Within this range the resistance of 1.2N-HCl solution of the alloy is increased. By a very small amount of M, the resistance to corrosion is improved. When containing above 80 atom % of M, the characteristics of the added metal M become superior to the characteristics of the metal titanium and the low resistance of Cr to sulfric acid, the low resistance of Ta to fluoric acid, and the low resistance of Re to nitric acid appear and prohibit practical use of the alloys and in addition, Re is expensive. The range of the content of M of 10 to 80 atom % is preferable because the resistance to water permeation of the layer is increased thereby. The range of 15 to 50 atom % is more preferable because the resistance to a 1.2N-HCl solution is excellent and the lattice spacing of the [002] plane can be 0.2270 A or less, which is also preferable. The range of 30 to 50 atom % is further preferred because the resistance to the crevice corrosion test by a 10 wt %-NaCl solution is excellent.

In another aspect, the content of the metal M in the alloy $Ti_{100-x}M_x$ is preferably 20 to 80 atom %, because the alloy becomes amorphous and has an excellent resistance to both acid and crevice corrosion, as seen from the Examples. This can be considered as follows. The "local corrosion", among corrosion of a metal, includes "pitting corrosion" forming recesses in the form of pits, "cracking corrosion" caused by stress, and "intergranular corrosion" formed from the grain boundary, etc. An amorphous metal can be considered to be a chemically uniform ideal metal, without nonuniform structures such as a grain boundary, dislocation and stacking fault inherent to a crystal. As a result, generally a local chemical potential difference at a surface, causing local corrosion, does not appear, and thus a high durability of the alloy was obtained as seen in the following examples.

As expected from the above and as mentioned before, it was found that, by applying a layer of an alloy of Ti with at least one of Cr, Ta and Re as a protecting layer for a magneto-optical recording film, the formation of pin holes and degradation of the alloy layer by chloric acid can be prevented, whereby the penetration of oxygen, water, chlorine, acids, and etc. to the magneto-optical recording layer can be prevented. It is thought that this is because the alloy layer per se is dense and resistant to the formation of pin holes and cracks, and this prevents a penetration of oxygen, water, chlorine, acids, and etc.

Thus, by inserting the above titanium alloy layer between an atmosphere-side organic protecting layer and the magneto-optical recording layer, a penetration of oxygen and water from the atmosphere and chlorine, acids, and etc. remaining in the organic protecting layer to the magneto-optical recording layer can be prevented, and therefore, the deterioration of the recording layer can be prevented. By inserting the above titanium alloy layer between a transparent substrate and the magneto-optical recording layer, deterioration of the recording layer by oxygen, water, chlorine, and etc. originated from a plastic substrate or a synthetic resin layer for forming tracking grooves on a glass substrate can be prevented. By inserting the above titanium alloy layer between a dielectric layer and the magneto-optical recording layer, deterioration of the recording layer by oxygen, nitrogen, fluoride, water, and etc. originated from the dielectric layer also can be prevented.

FIGS. 1 to 15 illustrate typical structures of magneto-optical recording media according to the present invention.

Figure 2:
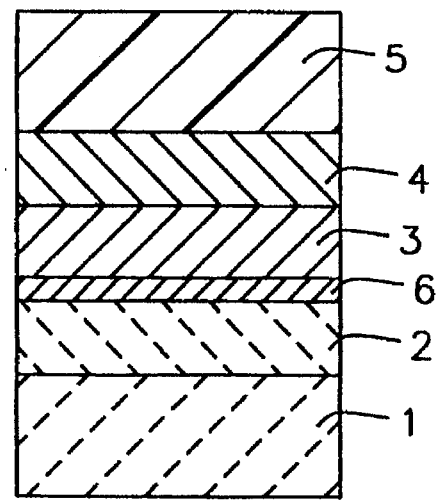

In FIG. 1, a magneto-optical recording layer 3 is formed on a substrate 1; a dielectric layer 2 being inserted between the recording layer 3 and the substrate 1. The dielectric layer 2 is of a nitride, a sulfide, etc., particularly a dielectric other than an oxide. A titanium alloy protecting and reflecting layer 4 is formed directly on the magneto-optical recording layer 3 and an organic protecting layer 5 is further formed on the titanium alloy protecting and reflecting layer 4. The titanium alloy protecting and reflecting layer 4 prevents a permeation of oxygen and water, etc. from the environment or the organic protecting layer 5 to the recording layer 3. A typical thickness of the dielectric layer 2 is 60 nm to 90 nm, that of the magneto-optical recording layer 3 is 10 nm to 60 nm, that of the titanium alloy protecting and reflecting layer 4 is 30 nm to 100 nm, and that of the organic protecting layer 5 is several µm or more. The thickness of the titanium alloy protecting and reflecting layer 4 may be thinner, for example, 10 nm, to effectively serve as a protecting layer, but the titanium alloy protecting and reflecting layer 4 should have a thickness of at least, for example, 30 nm to also serve as a reflecting layer. When the dielectric layer 2 is an oxide, the insertion of another titanium alloy protecting layer 6 between the oxide dielectrical layer 2 and the magneto-optical recording layer 3, to prevent deterioration of the magneto-optical recording layer 3 by the adjacent oxide layer 2, is preferred. This embodiment is shown in FIG. 2. In this embodiment, the thickness of the dielectric layer 2 is 60 nm to 90 nm and that of the titanium alloy protecting layer 6 is 1 nm to 5 nm, preferably 1 nm to 2 nm. The thin thickness of the titanium alloy protecting layer 6 is necessary because the light should transmit through this layer 6 to the recording layer.

Figure 3:
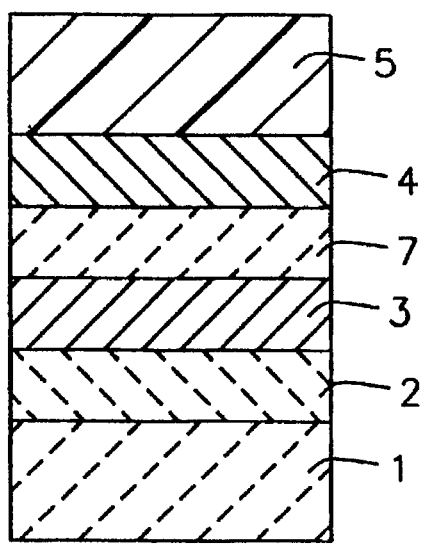

FIG. 3 illustrates an embodiment in which a second dielectric layer 7 is inserted between the magneto-optical recording layer 3 and the titanium alloy protecting and reflecting layer 4 in the embodiment shown in FIG. 2 to ensure the enhancement effect by the second dielectric layer 7. A typical thickness of the first dielectric layer 2 is 60 nm to 150 nm, that of the recording film 3 is 10 nm to 50 nm, that of the second dielectric layer 7 is 30 nm to 80 nm, that of the titanium alloy protecting layer 4 is 30 nm to 100 nm, and that of the organic protecting layer 5 is several µm or more.

Figure 4:
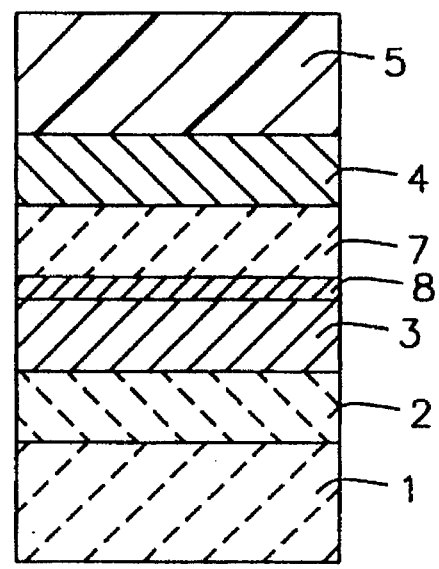

FIG. 4 illustrates a further modification of the embodiment shown in FIG. 3. In FIG. 4, a thin titanium alloy protecting layer (thickness 1–5 nm, preferably 1–2 nm) 8, in addition to the titanium alloy protecting layer 4, is further inserted between the recording layer 3 and the second dielectric layer 7, although the second dielectric layer 7 is not an oxide. This thin titanium alloy protecting layer 8 is formed to prevent a deterioration such as nitridation or sulfidation of the recording layer 3 by a deposition of the second dielectric layer 7 directly onto the recording film 3.

Figure 5:
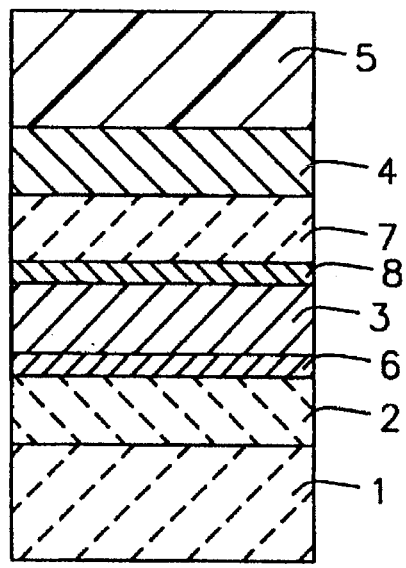

FIG. 5 shows a furthermore modification of the embodiment shown in FIG. 4. In FIG. 5, another thin titanium alloy protecting layer (thickness 1–5 nm, preferably 1–2 nm) 6 is also formed between the first dielectric layer 2, which is an oxide, and the recording layer 3.

Figure 6:
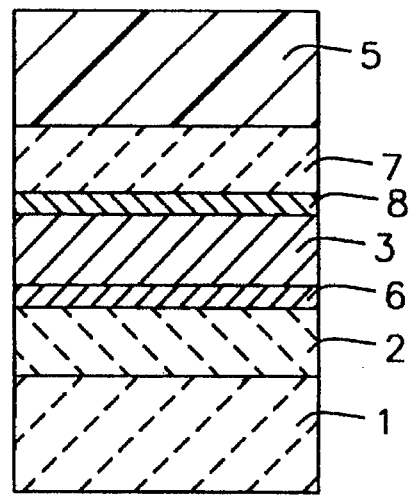

FIG. 6 shows an embodiment in which no reflecting layer but first and second dielectric layers 2 and 7 are provided. In FIG. 6, the first and second dielectric layers 2 and 7 are an oxide, and therefore, thin titanium alloy protecting layers (thickness 1–5 nm, preferably 1–2 nm) 6 and 8 are inserted between the recording layer 3 and the first and second dielectric layers 6 and 7, respectively. In this case, a typical thickness of the first and second dielectric layers 2 and 7 is 60 to 100 nm and that of the recording layer 3 is 60 to 100 nm.

Figure 7:
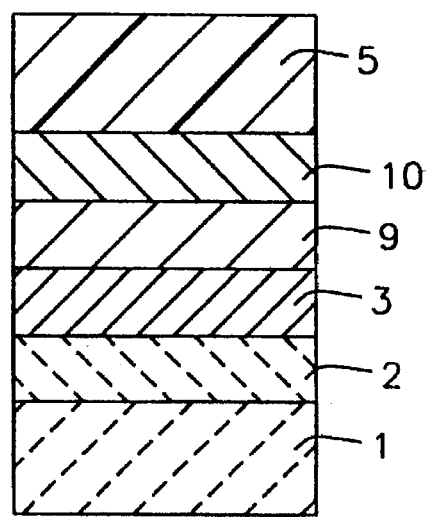

FIG. 7 illustrates a further embodiment of the present invention in which a reflecting layer 9, independently from a titanium alloy protecting layer 4, is formed between the recording layer 3 and the titanium alloy protecting layer 10. In this case, the titanium alloy protecting layer 10 serves to prevent a deterioration of the recording layer 3 and the reflecting layer 9 from the environment and the organic protecting layer 5. A typical thickness of the first dielectric layer 2 is 60 nm to 90 nnm, that of the recording layer 3 is 20 nm to 50 nm, that of the reflecting layer 9 is 5 nm to 100 nm, that of the titanium alloy protecting layer 10 is 1 nm to 100 nm, and that of the organic protecting layer 5 is several µm or more. As mentioned before, the thickness of the titanium alloy protecting layer 10 can be as thin as 1 nm, to serve as a protecting layer only.

Figure 8:
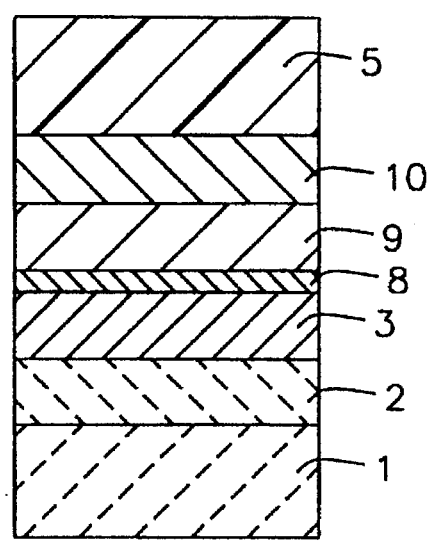
Figure 9:
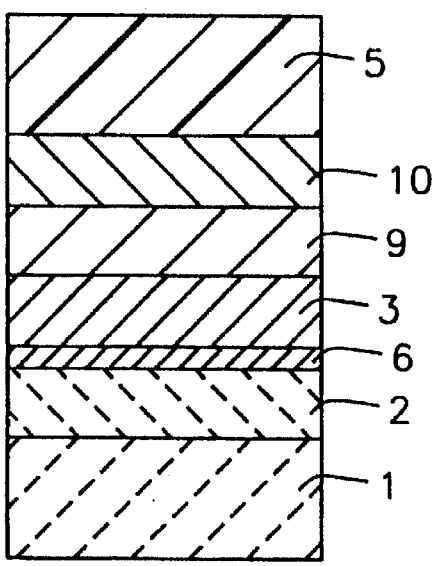
Figure 10:
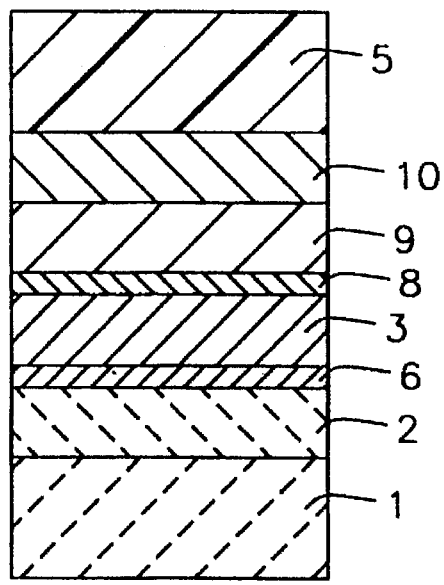
Figure 11:
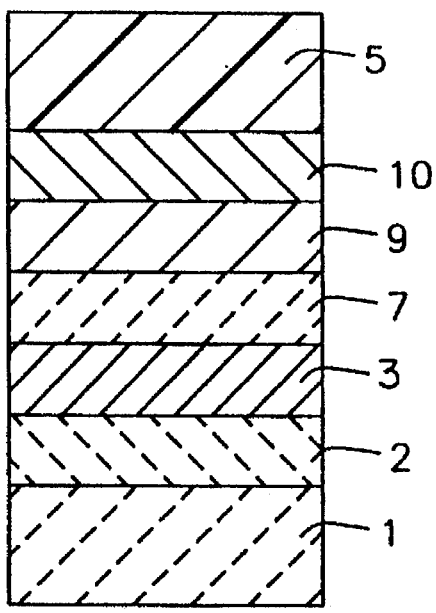
Figure 12:
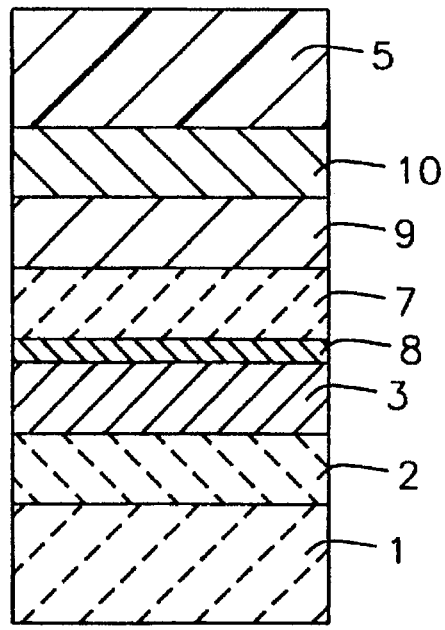
Figure 13:
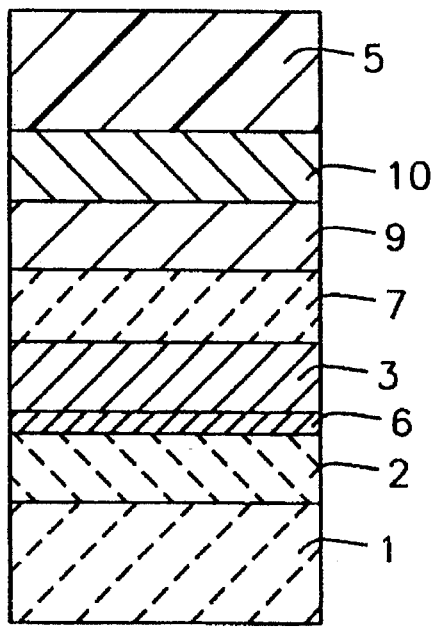
Figure 14:
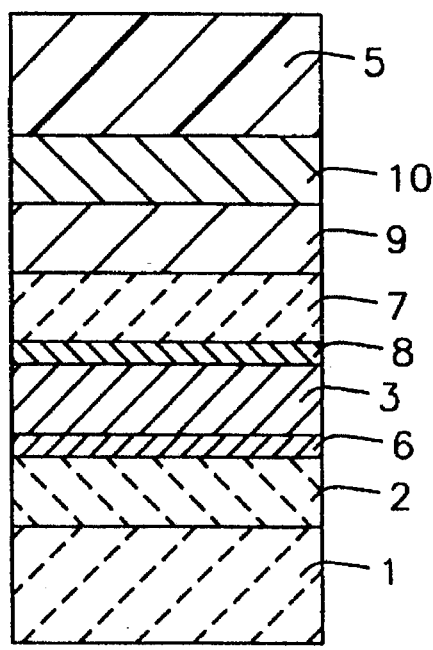

FIGS. 8 to 10 illustrate modifications of the embodiment shown in FIG. 7. In FIG. 8, a thin titanium alloy protecting layer (thickness 1–5 nm, preferably 1–2 nm) 8 is formed between the recording layer 3 and the reflecting layer 9 to prevent a deterioration of the recording layer 3 due to an electrochemical reaction between the reflecting layer 9 and the recording layer 3. In FIG. 9, a thin titanium alloy protecting layer (thickness 1–5 nm, preferably 1–2 nm) 6 is formed between the first dielectric layer 2, which is an oxide, and the recording layer 3. The thin titanium alloy protecting layer 6 prevents an oxidation of the recording layer 3 by the oxide layer 2. In FIG. 10, both the thin titanium alloy protecting layer 8 as in FIG. 8 and the thin titanium alloy protecting layer 6 as in FIG. 9 are formed.

FIGS. 11 to 14 illustrate the structures of the media similar to those of FIGS. 7 to 10, respectively, except that another dielectric 7 layer is inserted between the reflecting layer 9 and the magneto-optical recording layer 3 for obtaining the enhancement effect.

Although the embodiments shown in FIGS. 1 to 14 are directed to a medium in which the light is irradiated to the recording layer from the side of the substrate, it is obvious that a titanium alloy protecting layer according to the present invention can be applied to a medium in which the light is irradiated to the recording layer from the side opposite to the substrate.

Figure 15:
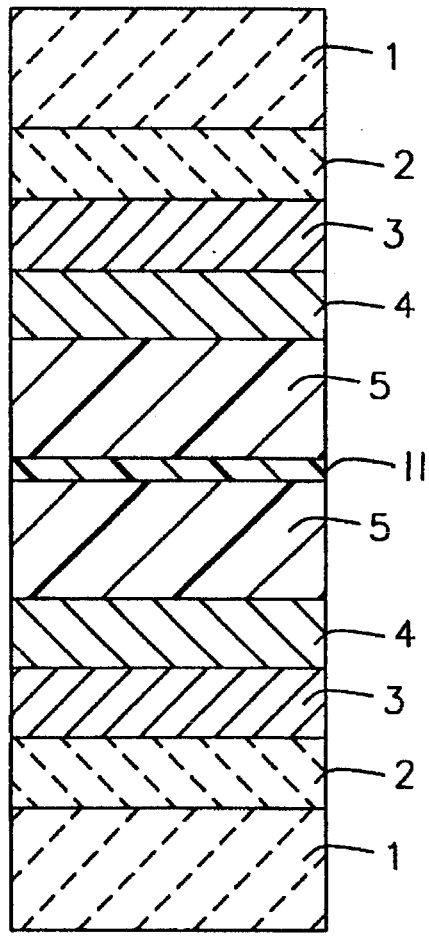

FIG. 15 illustrates an example of a double-sided magneto-optical recording medium in which an adhesive layer 11 of a thermosetting resin is used to adhere two single-sided magneto-optical recording media as shown in FIGS. 1–10 and both sides of the medium are used for recording. As understood from FIG. 15, each embodiment as shown in FIGS. 1 to 14 can be utilized to constitute a double-sided recording medium.

The titanium alloy protecting layer of a titanium alloy of Ti with at least one of Re, Cr and Ta provides an excellent improvement of the durability of the magneto-optical recording medium.

The titanium alloy protecting layer or protecting and reflecting layer may be formed by a conventional vacuum deposition, sputtering, ion beam sputtering, CVD, etc. The sputtering is preferred so that the deposited layer will not peel during a high temperature and high humidity resistance test, because the sputtering allows a strong adhesion to the underlying layer or substrate.

The magneto-optical recording layer may be any such layer which can record and reproduce information by the magneto-optical effect. Such a magneto-optical recording layer includes (1) layer of an RE (rare earth metal-TM (transition metal) alloy, for example, TbFe, DyFe, GdFe, NdFe, PrFe, SmFe, TbFeCo, DyFeCo, GdFeCo, GdTbFe, GdTbFeCo, TbDyFeCo, GdDyFeCo, NdDyFeCo, NdTbFeCo, NdDyTbFeCo, etc., (2) a laminate of the above RE-TM alloy layers, (3) a laminate of alternate RE and TM thin films such as RE/TM/RE/TM/RE/TM . . . , the thickness of each RE or TM being 0.1 to 30 nm and the thickness of the total laminate being 10 nm to 300 nm, (4) a laminate of alternate different metal thin films such as Cu/Co/Cu/Co/Cu/Co . . . , Pd/Co/Pd/Co/Pd/Co . . . , and Pt/Co/Pt/Co/Pt/Co . . . , the thickness of each metal thin film being 0.1 to 30 nm and the thickness of the total laminate being 10 to 300 nm, (5) a layer of Heusler's alloy, i.e., PtMnSb, and (6) a layer of bismuth-substituted garnet, $(Bi, RE)Fe_5O_{12}$.

The dielectric layer may be of nitrides, sulfides, fluorides, oxides, etc. or composites thereof, for example, AlN, ZnS, $CeF_3$, $AlF_3 \cdot 3NaF$, $Si_3N_4$, $SiO$, $SiO_2$, AlSiN, AlSiON, $In_2O_3$, $SnO_2$, Ti-containing $In_2O_3$, etc.; AlSiN, AlSiON, $In_2O_3$, $SnO_2$ etc. being preferred due to their excellent resistance to an environment. The transparent dielectric layer adjacent to the recording film, particularly at the light receiving side, should effectively enhance the Kerr effect, and the above nitrides etc., have such an effect. The dielectric layer may be formed by a conventional vacuum deposition, sputtering, ion beam sputtering, or CVD, etc.

The reflecting layer may be of any metal having a necessary light reflecting property, preferably, higher than that of the titanium alloy protecting layer, for example, aluminum, silver, copper, gold, or an alloy thereof with other metal of metals. The reflecting layer may be formed by vacuum deposition, sputtering, ion beam sputtering, or CVD, etc.

The substrate may be glass, or a synthetic resin, etc. Such a synthetic resin may be polycarbonate resin, acrylic resin, epoxy resin, 4-methyl pentene resin, or copolymers thereof. Polycarbonate resin is preferable due to its mechanical strength, resistance to an environment, and resistance to heat and humidity permeation.

The organic protecting layer is provided for protecting the medium from mechanical damages such as scratching and may be, for example, of various conventional light-sensitive resins. The organic protecting layer is usually preferably provided to the medium, but may be eliminated, particularly in the case of a double-side recording medium.

The titanium alloy protecting layer and organic protecting layer formed over the recording layer on the side opposite to the substrate, preferably cover not only the main surface but also the lateral sides of the recording layer.

The present invention will be described further with reference to the following Examples.

EXAMPLES 1–3

Magneto-optical recording media having the structure shown in FIG. 1 were manufactured, in which 1 denotes a substrate of polycarbonate, 2 a dielectric layer of AlSiN, 3 a recording layer of TbFeCo, 4 a titanium alloy protecting and reflecting layer, and 5 an organic protecting layer of a UV-cured phenol novolac epoxy acrylate resin. The titanium alloy protecting layer 4 was of $Ti_{80}Re_{20}$ (Example 1), $Ti_{80}Cr_{20}$ (Example 2), $Ti_{80}Ta_{20}$ (Example 3), respectively.

In a radio frequency magnetron sputtering device with three targets, a disc substrate 1 of polycarbonate resin (PC) having a diameter of 130 mm and a thickness of 1.2 mm, and having grooves at a 1.6 μm pitch was fixed in a vacuum chamber and the chamber was evacuated to $4 \times 10^{-7}$ Torr ($5.32 \times 10^{-5}$ Pa). During the deposition, the substrate 1 was rotated at 15 rpm while being cooled.

A gas flow of a mixture of argon and nitrogen ($Ar:N_2=70$ vol %:30 vol %) was introduced into the vacuum chamber and the pressure adjusted to 10 mTorr (1.33 Pa). The target was a disc of a sintered $Al_{50}Si_{50}$ having a diameter of 100 mm and a thickness of 5 mm. The radio frequency sputtering was carried out under the conditions of a discharge power of 100 W and a discharge radio frequency of 13.56 MHz, to deposit a dielectric layer 2 of $Al_{25}Si_{25}N_{50}$ at a thickness of about 80 nm.

Then the target was replaced by a $Tb_{23}Fe_{69}Co_8$ alloy disc, the $Ar/N_2$ gas flow was changed to a pure argon gas (5N, i.e., 5 nine grade) flow, the pressure was adjusted to 10 mTorr (1.33 Pa), and the discharge conditions used were the same as above, whereby a magneto-optical recording layer 3 of TbFeCo alloy was deposited at a thickness of about 40 nm.

Further, the target was replaced by a Ti disc on which chips (5×5×1 mm) of one of Re, Cr and Ta were arranged, and the discharge conditions were the same as above, whereby a titanium alloy protecting layer 4 was deposited at a thickness of about 50 nm.

Finally, the thus obtained laminate was removed from the sputtering device and arranged in a spin coater, and an ultra-violet-curable phenol novolac epoxy acrylate resin was coated on the disc while rotating the disc. The disc was then passed through an UV irradiation unit to cure the resin and form an organic protecting layer 5 at a thickness of about 50 μm.

The C/N (carrier to noise ratio) of the thus obtained media were evaluated, by measurement with a magneto-optical recording and reproducing device, Nakamichi OMS-1000Type (III), manufactured by Nakamichi corporation. The disc was rotated at a speed of 1800 rpm, a signal of 1.024 MHz was recorded at a location of 30 mm from the center of the disc by a semiconductor laser beam with a wave length of 830 nm and a power of 5.0 mW, and the recorded signal was read out by a semiconductor laser beam with a wavelength of 830 nm and a power of 0.8 mW. The applied magnetic field was 500 Oe. The obtained C/N of the samples of Examples 1 to 3 were 52 dB.

The surfaces of the discs of Examples 1 to 3 were observed and pin holes were not detected.

The samples were allowed to stand in a high temperature and high humidity atmosphere of 80° C. and 85% RH for 1000 hours. Thereafter the C/N was measured and no change was observed in comparison with that before the standing, and further pin holes were not observed, in any sample.

EXAMPLES 4–6

Magneto-optical recording media having the structure as shown in FIG. 2 were manufactured, in which 1 denotes a substrate of polycarbonate, 2 a dielectric layer of AlSiN, 6 a front titanium alloy protecting layer, 3 a recording layer of TbFeCo, 4 a rear titanium alloy protecting layer, and 5 an organic protecting layer of a UV-cured phenol novolac epoxy acrylate resin. The titanium alloy protecting layers 4 and 6 were of $Ti_{80}Re_{20}$ (Example 4), $Ti_{80}Cr_{20}$ (Example 5), $Ti_{80}Ta_{20}$ (Example 6), respectively.

In a radio frequency magnetron sputtering device with three targets, a disc substrate 1 of polycarbonate resin (PC) having a diameter of 130 mm and a thickness of 1.2 mm, and having grooves at a 1.6 μm pitch, was fixed in a vacuum chamber and the chamber was evacuated to $4 \times 10^{-7}$ Torr ($5.32 \times 10^{-5}$ Pa). During the deposition, the substrate 1 was rotated at 15 rpm while being cooled.

A gas flow of a mixture of argon and nitrogen ($Ar:N_2=70$ vol %:30 vol %) was introduced in the vacuum chamber and the pressure adjusted to 10 mTorr (1.33 Pa). The target was a disc of a sintered $Al_{50}Si_{50}$ having a diameter of 100 mm and a thickness of 5 mm and the radio frequency sputtering was carried out under the conditions of a discharge power of 100 W and a discharge radio frequency of 13.56 MHz, to deposit the dielectric layer 2 of $Al_{25}Si_{25}N_{50}$ at a thickness of about 80 nm.

Then, the target was replaced by a Ti disc on which chips (5×5×1 mm) of one of Re, Cr and Ta were arranged, the $Ar/N_2$ gas flow was changed to a pure argon gas (5N) flow, the pressure was adjusted to 10 mTorr (1.33 Pa), and the discharge conditions used were the same as above, whereby a front titanium alloy protecting layer 6 was deposited at a thickness of about 1.5 nm.

Then, the target was replaced by a $Tb_{23}Fe_{69}Co_8$ alloy disc, and the discharge conditions were the same as above, whereby a magneto-optical recording layer 3 of TbFeCo alloy was deposited at a thickness of about 40 nm.

Further, the target was replaced by the Ti disc on which chips (5×5×1 mm) of one of Re, Cr and Ta were arranged and the discharge conditions were the same as above, whereby a rear titanium alloy protecting layer 4 was deposited at a thickness of about 50 nm.

Finally, the thus obtained laminate was removed from the sputtering device and arranged in a spin coater, and an ultra-violet-curable phenol novolac epoxy acrylate resin was coated on the disc while rotating the disc. The disc was passed through an UV irradiation unit to cure the resin and form an organic protecting layer 5 at a thickness of about 50 µm.

The C/N (carrier to noise ratio) of the thus obtained media were evaluated by measurement with a magneto-optical recording and reproducing device, Nakamichi OMS-1000Type (III). The disc was rotated at a speed of 1800 rpm, a signal of 1.024 MHz was recorded at a location of 30 mm from the center of the disc by a semiconductor laser beam with a wave length of 830 nm and a power of 5.0 mW, and the recorded signal was read out by a semiconductor laser beam with a wavelength of 830 nm and a power of 0.8 mW. The applied magnetic field was 500 Oe. The obtained C/N of the samples of Examples 4 to 6 were 52 dB.

The surfaces of the discs of Examples 4 to 6 were observed and pin holes were not detected.

The samples were allowed to stand in a high temperature and high humidity atmosphere of 70° C. and 90% RH for 1000 hours. Thereafter, the C/N was measured but no change was observed in comparison with that before the standing and pin holes were not observed, in any sample.

COMPARATIVE EXAMPLE 1

A magneto-optical recording medium having the structure as shown in FIG. 2 was manufactured, in which 1 denotes a substrate of polycarbonate, 2 a dielectric layer of AlSiN, 6 a front titanium protecting layer, 3 a recording film of TbFeCo, 4 a rear titanium protecting and reflecting layer, and 5 an organic protecting layer of a UV-cured phenol novolac epoxy acrylate resin.

In the same radio frequency magnetron sputtering device as in Example 4, a disc substrate 1 of polycarbonate resin (PC) having a diameter of 130 mm and a thickness of 1.2 mm, and having grooves at a 1.6 µm pitch was fixed under the same conditions as in Example 4.

A gas flow of a mixture of argon and nitrogen (Ar:$N_2$=70 vol %:30 vol %) was introduced in the vacuum chamber and the pressure adjusted to 10 mTorr (1.33 Pa). The target was a disc of a sintered $Al_{50}Si_{50}$ having a diameter of 100 mm and a thickness of 5 mm, and the radio frequency sputtering was carried out under the conditions of a discharge power of 100 W and a discharge radio frequency of 13.5 MHz, to deposit the dielectric layer 2 of $Al_{25}Si_{25}N_{50}$ at a thickness of about 80 nm.

Then, the target was replaced by a Ti disc, the Ar/$N_2$ gas flow was changed to a pure argon gas (5N) flow, the pressure was adjusted to 10 mTorr (1.33 Pa), and the discharge conditions used were the same as above, whereby a front titanium protecting layer 6 was deposited at a thickness of about 1.5 nm.

Then, the target was replaced by a $Tb_{23}Fe_{69}Co_8$ alloy disc and the discharge conditions used were the same as above, whereby a magneto-optical recording layer 3 of TbFeCo alloy was deposited at a thickness of about 40 nm.

Further, the target was replaced by the Ti disc, and the discharge conditions were the same as above, whereby a rear titanium protecting and reflecting layer 4 was deposited at a thickness of about 50 nm.

Finally, the thus obtained laminate was removed from the sputtering device and arranged in a spin coater, and an ultra-violet-curable phenol novolac epoxy acrylate resin was coated on the disc while rotating the disc. The disc was passed through an UV irradiation unit to cure the resin to form an organic protecting layer 5 at a thickness of about 50 µm.

The C/N (carrier to noise ratio) of thus obtained media were evaluated under the same conditions as in Example 4. The obtained C/N of the sample was 50 dB.

Many pin holes were observed on the surface of the disc.

The samples were allowed to stand in a high temperature and high humidity atmosphere of 70° C. and 90% RH for 1000 hours. Thereafter, the C/N was measured and lowered by 2 dB, from 50 dB to 48 dB, and the number of pin holes was increased in comaprison with that before the high temperature and high humidity test.

Thus, the superiority of the present invention was confirmed.

EXAMPLES 7–8

Magneto-optical recording media, having a structure as shown in FIG. 2 except that an organic protecting layer is not formed, were manufactured, which comprises a substrate 1 of polycarbonate, a dielectric layer 2 of $In_2O_3$, a front titanium alloy protecting layer 6, a recording layer 3 of TbFeCo, and a rear titanium alloy protecting and reflecting layer 4. The titanium alloy protecting layers 4 and 6 were $Ti_{70}Re_{20}Cr_{10}$ (Example 7) and $Ti_{70}Cr_{20}Ta_{10}$ (Example 8), respectively.

In the same radio frequency magnetron sputtering device as in Example 4, a disc substrate 1 of polycarbonate resin (PC) having a diameter of 130 mm and a thickness of 1.2 mm, and having grooves at a 1.6 µm pitch was arranged under the same conditions as in Example 4.

A gas flow of a mixture of pure argon (5N) was introduced in the vacuum chamber and the pressure adjusted to 10 mTorr (1.33 Pa). The target was a disc of a sintered $In_2O_3$ having a diameter of 100 mm and a thickness 5 mm and the radio frequency sputtering was carried out under the conditions of a discharge power of 100 W and a discharge radio frequency of 13.56 MHz, to deposit the dielectric layer 2 of $In_2O_3$ at a thickness of about 80 nm.

Then, the target was replaced by a Ti disc on which chips (5×5×1 mm) of one of Re, Cr and Ta were arranged, and the discharge conditions were the same as above, whereby a front titanium alloy protecting layer 6 was deposited at a thickness of about 1.5 nm.

Then, the target was replaced by a $Tb_{23}Fe_{69}Co_8$ alloy disc and the discharge conditions used were the same as above, whereby a magneto-optical recording layer 3 of TbFeCo alloy was deposited at a thickness of about 40 nm.

Further, the target was replaced by the Ti disc on which chips (5×5×1 mm) of one of Re, Cr and Ta were arranged and the discharge conditions used were the same as above, whereby a rear titanium alloy protecting and reflecting layer 4 was deposited at a thickness of about 50 nm.

The C/N of the thus obtained media were evaluated under the same conditions as in Example 4. The obtained C/N of the samples of Examples 7 and 8 were 52 dB.

The surfaces of the discs of Examples 7 and 8 were observed and pin holes were not detected.

The samples were allowed to stand in a high temperature and high humidity atmosphere of 70° C. and 90% RH for 1000 hours. Thereafter, the C/N was measured but no change was observed in comparison with that before the standing and pin holes were not observed, in any sample.

EXAMPLE 9

A magneto-optical recording medium, having a structure as shown in FIG. 2 except for that an organic protecting layer is not formed, was manufactured, which comprises a substrate 1 of polycarbonate, a dielectric layer 2 of $In_2O_3$, a front titanium alloy protecting layer 6 of TiCr, a recording layer 3 of TbFeCo, and a rear titanium alloy protecting a reflecting layer 4 of TiCr.

In a radio frequency magnetron sputtering device with three targets, a disc substrate 1 of polycarbonate resin (PC) having a diameter of 130 mm and a thickness of 1.2 mm, and having grooves at a 1.6 μm pitch was fixed in a vacuum chamber and the chamber was evacuated to $4\times10^{-7}$ Torr ($5.32\times10^{-5}$ Pa). During the deposition, the substrate 1 was rotated at 15 rpm while being cooled.

A pure argon gas (5N) flow was introduced in the vacuum changer and the pressure adjusted to 10 mTorr (1.33 Pa). The target was a disc of a sintered $In_2O_3$ having a diameter of 100 mm and a thickness of 5 mm, and the radio frequency sputtering was carried out under the conditions of a discharge power of 100 W and a discharge radio frequency of 13.56 MHz, to deposit the dielectric layer 2 of $In_2O_3$ at a thickness of about 80 nm.

Then, the target was replaced by a Ti disc on which Cr chips (5×5×1 mm) were arranged, and the discharge conditions used were the same as above, thereby a front titanium alloy protecting layer of amorphous $Ti_{40}Cr_{40}$ alloy 6 was deposited at a thickness of about 1.5 nm.

Then, the target was replace by a $Tb_{23}Fe_{69}Co_8$ alloy disc and the discharge conditions used were the same as above, whereby a magneto-optical recording layer 3 of TbFeCo alloy was deposited at a thickness of about 40 nm.

Further, the target was replaced by the Ti disc on which Cr chips (5×5×1 mm) were arranged and the discharge conditions used was the same as above, whereby a titanium alloy protecting and reflecting layer 4 of amorphous $Ti_{40}Cr_{60}$ alloy was deposited at a thickness of about 50 nm.

The C/N of the thus obtained medium was evaluated under the same conditions as in Example 4. The obtained C/N of the sample was 52 dB.

The surface of the disc of Example 9 was observed and pin holes were not detected.

The samples were allowed to stand in a high temperature and high humidity atmosphere of 70° C. and 90% RH for 1000 hours. Thereafter the C/N was measured but no change was observed in comparison with before the standing and no pin holes were observed.

We claim:

1. A magneto-optical recording medium, comprising:

a substrate a magneto-optical recording layer above the substrate; and a first metal protecting layer over the magneto-optical recording layer, the first metal protecting layer being made of a titanium alloy wherein said titanium alloy comprises at least one element of chromium and tantalum and is selected from the group consisting of:

i) a titanium alloy comprised of only titanium and 10 to 80 atom % chromium and is amorphous or crystalline, when crystalline, said titanium alloy having a lattice spacing of the [002] plane of no greater than 0.23320 nm;

ii) a titanium alloy comprised of only titanium and from 30 atom % up to 50 atom % tantalum and a lattice spacing of the [002] plane of no greater than 0.2320 nm; and iii) a titanium alloy comprised of only titanium and from 20 to 80 atom % total of chromium and tantalum and a lattice of spacing of the [002] plane of no greater than 0.2320 nm.

2. A magneto-optical recording medium having a protective layer which is resistant to permeating and diffusion of at least one of oxygen, water, chlorine or acids, said medium comprising;

a) a substrate b) a magneto-optical recording layer above the substrate;

c) a first metal protecting layer over the magneto-optical recording layer; and d) an organic protecting layer above the first metal protecting layer;

said first metal protecting layer being made of titanium alloy, wherein said titanium alloy comprises at least one element of chromium and tantalum and is selected from the group consisting of:

i) a titanium alloy comprised of only titanium and 10 to 80 atom % chromium and is amorphous or crystalline, when crystalline said titanium alloy having a lattice spacing of the [002] plane of no greater than 0.2320 nm;

ii) a titanium alloy comprised of only titanium and from 30 atom % up to 50 atom % tantalum and a lattice spacing of the [002] plane of no greater than 0.2320 nm; and iii) a titanium alloy comprised of titanium and 20 to 80 atoms % total of chromium and tantalum and a lattice spacing of the [002] plane of no greater than 0.2320 nm.

3. A magneto-optical recording medium, comprising:

a substrate;

a magneto-optical recording layer above the substrate;

a reflecting layer above the magneto-optical recording layer; and a first metal protecting layer over the reflecting layer, the first metal protecting layer being made of a titanium alloy wherein said titanium alloy comprises at least one element of chromium and tantalum and is selected from the group consisting of:

i) a titanium alloy comprised of only titanium and 10 to 80 atom % chromium and is amorphous or crystalline, when crystalline, said titanium alloy has a lattice spacing of the [002] plane of no greater than 0.2320 nm;

ii) a titanium alloy comprised of only titanium and from 30 atom % up to 50 atom % tantalum and has a lattice spacing of the [002] plane of no greater than 0.2320 nm; and iii) a titanium alloy comprised of titanium and 20 to 80 atom % total of chromium and tantalum and has a lattice spacing of the [002] plane of no greater than 0.2320 nm.

4. A medium according to claim 1, wherein the magneto-optical recording layer is made of an alloy of a rear earth metal and a transition metal.

5. A medium according to claim 1, further comprising a first dielectric layer between the substrate and the magneto-optical recording layer.

6. A medium according to claim 5, further comprising an organic protecting layer above the first metal protecting layer.

7. A medium according to claim 5, further comprising a second metal protecting layer in contact with the magneto-optical recording layer and between the first dielectric layer and the magneto-optical recording layer, the second metal protecting layer being made of a titanium alloy comprised of titanium and at least one of rhenium, chromium and tantalum and having a thickness no 1 to 5 nm.

8. A medium according to claim 7, further comprising an organic protecting layer above the first metal protecting layer.

9. A medium according to claim 5, wherein the first metal protecting layer also serves as a reflecting layer.

10. A medium according to claim 9, further comprising a second dielectric layer between the magneto-optical recording layer and the first metal protecting layer.

11. A medium according to claim 10, further comprising a second metal protecting layer in contact with at least one side of the magneto-optical recording layer, the second metal protecting layer being made of a titanium alloy comprised of titanium and at least one of rhenium, chromium and tantalum and having a thickness of 1 to 5 nm.

12. A medium according to claim 3, wherein the reflecting layer is a metal layer having a reflectivity higher than that of the first metal protecting layer.

13. A medium according to claim 3, further comprising a first dielectric layer between the substrate and the magneto-optical recording layer.

14. A medium according to claim 13, further comprising an organic protecting layer above the first metal protecting layer.

15. A medium according to claim 13, further comprising at least one second metal protecting layer in contact with a least one side of the magneto-optical recording layer, the second metal protecting layer being made of a titanium alloy comprised of titanium and at least one of rhenium, chromium and tantalum and having a thickness of 1 to 5 nm.

16. A medium according to claim 13, further comprising a second dielectric layer between the magneto-optical recording layer and the reflecting layer.

17. A medium according to claim 16 further comprising at least one second metal protecting layer in contact with at least one side of the magneto-optical recording layer.

18. A medium according to claim 16, further comprising an organic protecting layer above the first metal protecting layer.

* * * * *